(12) United States Patent
Conrad et al.

(10) Patent No.: US 7,059,828 B2
(45) Date of Patent: Jun. 13, 2006

(54) GAS FRICTION PUMP

(75) Inventors: Armin Conrad, Herborn (DE); Jörg Stanzel, Wetzlar (DE)

(73) Assignee: Pfeiffer Vacuum GmbH, Asslar (DE)

( * ) Notice: Subject to any disclaimer, the term of this patent is extended or adjusted under 35 U.S.C. 154(b) by 128 days.

(21) Appl. No.: 10/773,475

(22) Filed: Feb. 5, 2004

(65) Prior Publication Data

US 2005/0169745 A1     Aug. 4, 2005

(30) Foreign Application Priority Data

Jan. 29, 2004   (EP)   ................... 04001872

(51) Int. Cl.
 *F01D 25/06*    (2006.01)

(52) U.S. Cl. ................ 415/170.1; 415/55.1; 415/90
(58) Field of Classification Search ............ 415/90, 415/143, 170.1, 229, 55.1, 55.5, 55.6, 58.7
See application file for complete search history.

(56) References Cited

U.S. PATENT DOCUMENTS

| 5,380,171 | A | | 1/1995 | Nagaoka et al. ......... 417/423.4 |
| 5,501,583 | A | * | 3/1996 | Nagaoka et al. ......... 417/423.4 |

FOREIGN PATENT DOCUMENTS

| DE | 3716221 | 11/1987 |
| FR | 1475765 | 2/1967 |

* cited by examiner

*Primary Examiner*—Edward K. Look
*Assistant Examiner*—Dwayne J White
(74) *Attorney, Agent, or Firm*—Abelman, Frayne & Schwab

(57) ABSTRACT

A gas friction pump, comprising stationary pump-active components (14) and rotatable pump-active components (15) secured on a rotatable rotor shaft (4), wherein the rotor shaft is supported with a bearing (5) at the high-vacuum-side end and a bearing arrangement at a fore-vacuum side end, characterized in that the high-vacuum side bearing is formed as a conventional bearing, and the fore-vacuum bearing arrangement contains at least one gas bearing. In an advantageous embodiment, the gas bearing is formed as a module and can be brought in engagement with a cylindrical portion of the housing and secured therein.

6 Claims, 2 Drawing Sheets

GAS FRICTION PUMP

Figure 1:
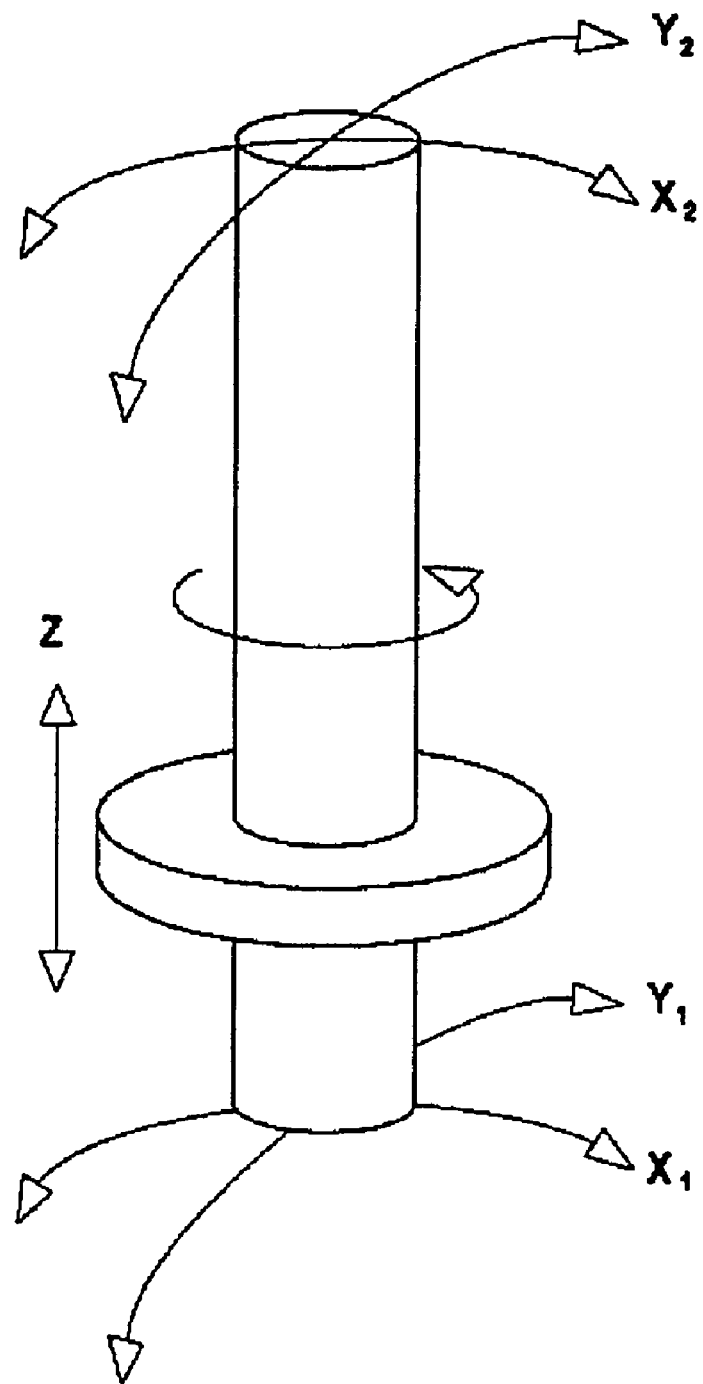

The invention relates to a gas friction pump according to the preamble of the first claim.

Manufacturing of semiconductors present high demands to the used in manufacturing, vacuum pumps. The manufacturing processes involve high gas loads, and the vacuum purity should be as high as possible. In particular, hydrocarbons should be reliably eliminated from the process space. Gas friction pumps substantially meet these requirements because due to their functioning, the pressure ratio increases exponentially with the molecular weight. Turbomolecular pump and molecular pump, e.g., based on the Holweck principle, have a great success on the market. Often, both types of pumps are combined with each other to achieve a good fore-vacuum compatibility. With these pumps, the problem is the bearings. Initially used oil-lubricated or greased bearings present a drawback for the above-described usage. While during the operation of the pump, an effective pumping-out of hydrocarbons, which are released from oil and grease, is effected by the pump itself, they can reach the process space when the pumps are idle. In addition to this problem, ball bearings require frequent maintenance.

Therefore, the object of the development was to develop dry bearings for rapidly rotating rotors. Two methods were developed. According to one, new and high-quality magnetic materials enabled construction of active and passive magnetic bearings. Passive magnetic bearings are based on permanent magnets, while active magnetic bearings have a complex construction. Sensors in them precisely determine the position of a rotor and communicate it in form of a signal to control electronics. This controls the electromagnets which then change the position of the rotor.

According to the second method, gas bearings were used for the rotors.

While magnetic bearings, despite high costs associated with electronic control and noticeable general costs found use and are counted as conventional bearings, the gas bearings up to now could not find usage.

Publications DE-OS 22 55 618 and DE-OS 23 59 456 disclose different variants of turbomolecular pumps with gas bearings. In those, the above-described drawbacks of mechanical and magnetic bearings are partially overcome. However, they could not find practical usage for the following reasons: a two high gas throughput, damaging dead spaces between the rotor and stator discs, too large length of the pump, inadequate stability, unsatisfactory precision over the entire laying-out length during assembly, etc.

A further development lead to a system with which these drawbacks can be partially eliminated (German Patent DE-PS 44 36 156). By using the laser technology, it became possible to drill a large number of microholes in bearing surfaces. Those replaced conventional gas bearings with small nozzles. Because of a stable support, the gas throughout and the dead spaces were reduced, and the stability can be increased due to more narrow clearances.

The methods of construction of gas-supported gas friction pumps can be divided into two categories. The distinguishing feature here is the type of the rotor support. One consists in support of a bell-shaped rotor according to DE-OS 23 59 456, another consists in a floating support disclosed in DE-OS 199 15 983.

Bell-shaped rotors such as disclosed, e.g., in DE-OS 22 55 618 are now used in turbomolecular pumps, in particular, magnetically supported pumps are formed in this way. For gas-supported pumps, their construction can also present an interest as the advantage of this support consists in that both support point are located within the rotor. The gas, which produces a gas film hover over the rotor, and cannot reach the high-vacuum region with this construction. A big drawback of this rotors consists in that because of a large hub diameter it is impossible to assemble jointly the rotor blades in form of rotor discs on a hollow shaft. Rather, the rotor should be formed as a single piece which presents increased demands to manufacturing. The processing time is noticeably greater than when discs are used, and a small error in the manufacturing process leads to the complete loss of a rotor. The manufacturing of bell-shaped rotors is also very expensive.

A floating rotor support according to DE-OS 199 15 983 does not have these problems. However, this type of support from a rotary dynamic point of view is associated with other ones. For one, the natural resonance of the rotor is shifted to lower frequencies. This reduces the maximally achievable rotational speed and worsens thereby the pump characteristics. However, primarily, the biggest drawback is a high load applied to the bearing, in particular, to the bearing in vicinity of the rotor because of a noticeably higher bearing pressure. This increases the demands to the bearing and reduces the compatibility with, e.g., high gas loads. Further, this support principle is not, from the start, deep, and also care should be taken that gas from the bearing does not reach the high-vacuum region.

The object of the invention is to produce a dry supported gas friction pump. It should have a simple construction that would enable a cost-effective manufacturing. The support should have favorable rotary dynamic characteristics.

This object is achieved with features of the characterized clause of the first claim. The use of two different support principles free from organic lubrication means enabled to combine the advantage of a dry support (maintenance-free, hydrocarbon-free) with advantages of a high rotary dynamic stability and reduced manufacturing costs.

A conventional dry bearing is provided at a high-vacuum side end of the rotor shaft, and a gas support at the fore-vacuum side end which supports the rotor radially and axially. The support at both ends of the rotor shaft leads to the best possible rotary dynamic characteristics as the bearing pressure is low, and the natural resonance of the shafts enables rotation with a high rotational speed.

The present invention will now be described in detail with reference to the drawings.

Figure 2:
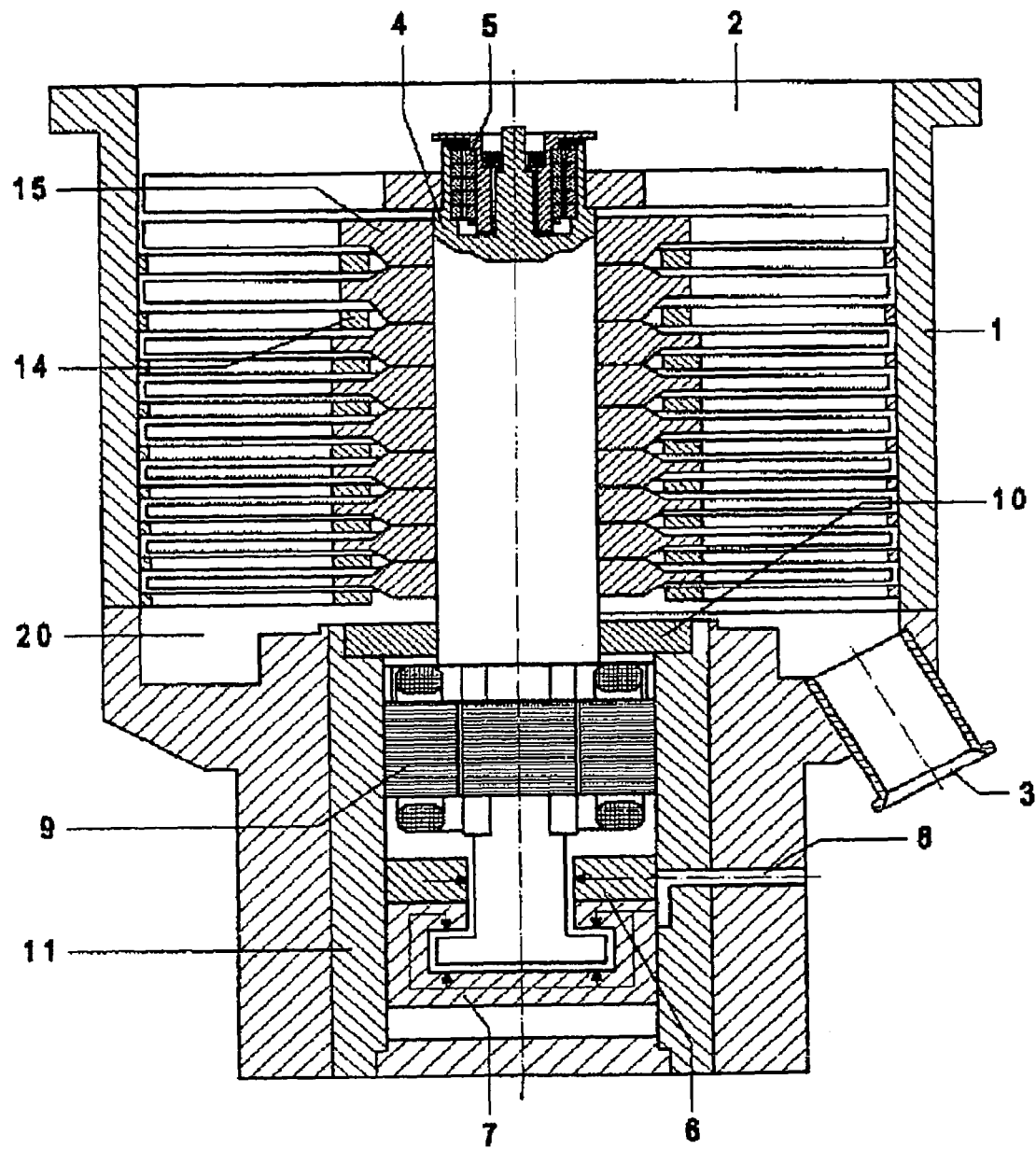

FIG. 1: a schematically shown, rotor shaft and its degrees of freedom,

FIG. 2: a turbomolecular pump formed according to the teachings of the invention.

A shaft, such as contained in a gas friction pump for supporting the rotor, has six degrees of freedom. This is shown in FIG. 1. One of the degrees of freedom is rotational which is essential for functioning of the pump and is influenced by a motor. The axial degree of freedom is shown with z, in addition, there exist tiling degrees of freedom $x_1$, $y_1$ at a lower fore-vacuum side end and $x_2$, $y_2$ at an upper, high-vacuum side end of the shaft. These radial and axial degrees of freedom must be supported with bearings.

Contrary to existing solutions, according to the invention, the degrees of freedom $x_2$, $y_2$ are supported with a dry, conventional bearing, e.g., a permanent magnet bearing. Thereby, an oil-free and maintenance free bearing is provided in the high-vacuum region.

According to the invention, the degrees of freedom $x_1$, $y_1$, and z are supported with gas bearings, whereby a more simple and cost-effective support than with active magnet bearings is achieved. Contrary to existing concepts, the points of support for gas-supported gas friction pumps lie at the ends of shaft, whereby a best possible support from the point of view of dynamics of rotation. The natural resonance of a rotor, which is supported at both ends, permits rotation with a high rotational speed, which improves pump characteristics. For implementation of the invention all types of gas bearings can be used and, in particular, aerodynamic and aerostatic bearings.

The use of this new principle in a gas friction pump is shown in FIG. 2 as implemented in a turbomolecular pump. In a pump housing 1 having a suction opening 2 and a gas outlet opening 3, there are mounted stationary, pump-active components such as stator discs 14. The rotatable pump-active components, which are formed as rotor discs 15 are fixedly mounted on a rotor shaft 4. This one is rotated with a drive 9.

The rotor shaft 4 is supported with a radial bearing 5 at the high-vacuum side and a radial bearing 6 and an axial bearing 7 at the fore-vacuum side. The bearing 5 is formed as a conventional dry bearing, e.g., as a permanent magnetic bearing. In a cylindrical sleeve 11, there are arranged a lower radial gas bearing 6, the axial bearing 7, and the drive 9. The operational gas is fed to the gas bearing through a gas feeding conduit 8. This operational gas, which forms a gas film, on which a supportable object hovers, flows out of the gas bearing. It should not reach the region of low pressures and should be held away from the pump chamber and a gas outlet 20 with sealing means 10. The sealing means can be formed, for example, as labyrinth seals. Advantageously, the bearings 6 and 7 are formed with the same outer diameter and are then inserted into the sleeve 11.

The cost-effective manufacturing of the rotor is possible because the rotating pump-active components 15 are produced separately and then as a package can be jointly mounted on the rotor shaft.

With a gas bearing, the dimensional accuracy should be very high, and small errors during manufacturing exclude their use in a pump. A modular construction of a gas bearing reduces manufacturing costs, while defective bearings do not lead to a total loss of a pump. Below, a unit, which contains all of the essential components of a bearing, is considered to be a module. Thus, a radial or a combination of axial and radial bearings can form a separate module. This module is then arranged in the sleeve 11 in the lower portion of the pumping housing. The use of a module principle is not limited to only gas bearings, a modular construction can be formed of other bearings also. E.g., a magnet bearing and a gas bearing can be combined in one or several modules.

It is further advantageous, to incorporate the drive 9 in an appropriate module and, together with other modules, arrange in the sleeve.

The invention claimed is:

1. A dry gas friction vacuum pump having a high-vacuum side and a fore-vacuum side, the pump comprising a housing (1); a rotatable rotor shaft arranged in the housing and having a high-vacuum side end and fore-vacuum side end; stationary pump-active components (14) and rotatable pump-active components (15) secured on the rotatable rotor shaft (4), wherein the rotor shaft is supported with a permanent magnet bearing (5) at the high-vacuum-side end thereof and a bearing arrangement at the fore-vacuum side end thereof and wherein fore-vacuum side end bearing arrangement contains at least one gas bearing.

2. A dry gas friction vacuum pump according to claim 1, wherein bearing (6) for supporting the shaft radially and an axial bearing (7) for supporting the shaft axially and wherein both the radial and axial bearings are formed as gas bearings.

3. A dry gas friction vacuum pump according to claim 1, wherein the bearing arrangement is formed as a module arranged and secured in a cylindrically formed portion (11) of a pump housing provided at the fore vacuum side of the pump.

4. A dry gas friction vacuum pump according to claim 1, further comprising a drive (9) for rotating the rotor, wherein the drive (9) is formed as a module and is arranged and secured in a cylindrically formed portion (11) of a pump housing provided at the fore-vacuum side.

5. A gas friction pump according to claim 1, between the gas bearing and a low-pressure side, sealing means (10) is provided.

6. A dry gas friction vacuum pump according to claim 1, further comprising a drive for rotating the rotor, wherein the fore-vacuum bearing arrangement contains a radial bearing (6) for supporting the shaft radially and an axial bearing (7) for supporting the shaft axially, wherein the radial bearing and the axial bearing form a first module and the drive forms a second module; and wherein the first and the second modules are mounted in a common sleeve, and the sleeve is received and secured in a cylindrically formed portion of a pump housing provided at the fore-vacuum side.

* * * * *